(12) United States Patent
Eick et al.

(10) Patent No.: US 8,818,730 B2
(45) Date of Patent: Aug. 26, 2014

(54) UNIQUE COMPOSITE RELATIVELY ADJUSTED PULSE

(75) Inventors: Peter M. Eick, Houston, TX (US); Joel D. Brewer, Houston, TX (US); Frank D. Janiszewski, Richmond, TX (US); Charles C. Mosher, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 441 days.

(21) Appl. No.: 13/185,113

(22) Filed: Jul. 18, 2011

(65) Prior Publication Data

US 2012/0035853 A1 Feb. 9, 2012

Related U.S. Application Data

(60) Provisional application No. 61/365,631, filed on Jul. 19, 2010, provisional application No. 61/365,663, filed on Jul. 19, 2010, provisional application No. 61/494,952, filed on Jun. 9, 2011.

(51) Int. Cl.
*G01V 1/30* (2006.01)
*G06F 19/00* (2011.01)
*G01V 1/38* (2006.01)

(52) U.S. Cl.
CPC .................................. *G01V 1/3808* (2013.01)
USPC .................................. 702/16; 367/21; 367/73

(58) Field of Classification Search
CPC ............. G01V 1/28; G01V 1/38; G01V 1/00; G01V 1/30; G01V 1/16; G06F 19/00; H04R 1/02
USPC ......................................... 702/16; 367/21, 73
See application file for complete search history.

(56) References Cited

U.S. PATENT DOCUMENTS

| | | | |
|---|---|---|---|
| 3,676,841 | A | 7/1972 | Anstey |
| 4,147,228 | A | 4/1979 | Bouyoucos |
| 4,648,080 | A | 3/1987 | Hargreaves |
| 4,969,129 | A | 11/1990 | Currie |
| 5,058,080 | A | 10/1991 | Siems et al. |

(Continued)

FOREIGN PATENT DOCUMENTS

| | | |
|---|---|---|
| WO | 0161380 | 8/2001 |
| WO | 0225315 | 3/2002 |
| WO | 131619 | 10/2009 |
| WO | 138727 | 11/2009 |

OTHER PUBLICATIONS

PCT International Search Report PCT/US2011/044540 (PCT/ISA/220) Dated Nov. 25, 2011.

*Primary Examiner* — John Breene
*Assistant Examiner* — Ruihua Zhang
(74) *Attorney, Agent, or Firm* — ConocoPhillips Company

(57) ABSTRACT

The invention relates to acquiring seismic data in either land or marine environments, but typically marine environments where a pulse-type source is fired in a distinctive composite pulse like a distinctive rumble. In a preferred embodiment, a number of pulse-type seismic sources, sometimes called an array, are fired in a distinctive composite pulse to be able to identify within the returning wavefield the energy resulting from the composite pulse. Firing the pulse-type sources creates an identifiable signature so that two or more marine seismic acquisition systems with source arrays can be acquiring seismic data concurrently and the peak energy delivered into the water will be less, which will reduce the irritation of seismic data acquisition to marine life.

26 Claims, 9 Drawing Sheets

(56) References Cited

U.S. PATENT DOCUMENTS

| | | |
|---|---|---|
| 5,142,498 A | 8/1992 | Duren |
| 5,200,927 A | 4/1993 | Cretin et al. |
| 5,281,773 A * | 1/1994 | Duren ............... 181/111 |
| 5,448,531 A | 9/1995 | Dragoset |
| 5,650,981 A | 7/1997 | Jacobsen et al. |
| 6,028,818 A | 2/2000 | Jeffryes |
| 6,101,448 A | 8/2000 | Ikelle et al. |
| 6,751,559 B2 | 6/2004 | Fookes et al. |
| 6,882,938 B2 | 4/2005 | Vaage et al. |
| 6,906,981 B2 | 6/2005 | Vaage |
| 6,906,982 B2 | 6/2005 | Calvert |
| 7,286,442 B2 | 10/2007 | Ray et al. |
| 7,675,812 B2 | 3/2010 | Ferris |
| 8,000,168 B2 | 8/2011 | Eick et al. |
| 8,004,931 B2 | 8/2011 | Eick et al. |
| 2005/0027454 A1* | 2/2005 | Vaage et al. ............ 702/17 |
| 2007/0091719 A1* | 4/2007 | Falkenberg et al. ...... 367/19 |
| 2007/0274155 A1 | 11/2007 | Ikelle |
| 2009/0010103 A1 | 1/2009 | Sallas et al. |
| 2010/0008184 A1* | 1/2010 | Hegna et al. ........... 367/21 |
| 2010/0039894 A1 | 2/2010 | Abma |
| 2010/0103772 A1 | 4/2010 | Eick et al. |
| 2010/0271904 A1* | 10/2010 | Moore et al. ........... 367/73 |
| 2011/0305107 A1 | 12/2011 | Eick et al. |
| 2012/0014212 A1 | 1/2012 | Eick et al. |
| 2012/0039150 A1 | 2/2012 | Eick et al. |
| 2012/0113745 A1 | 5/2012 | Eick et al. |

* cited by examiner

US 8,818,730 B2

UNIQUE COMPOSITE RELATIVELY ADJUSTED PULSE

CROSS-REFERENCE TO RELATED APPLICATIONS

This application is a non-provisional application which claims benefit under 35 USC §119(e) to U.S. Provisional Application Ser. No. 61/365,631, filed Jul. 19, 2010 entitled "Unique Composite Relatively Adjusted Pulse" and U.S. Provisional Patent Application Ser. No. 61/365,663, filed Jul. 19, 2010 entitled "Continuous Composite Relatively Adjusted Pulse" and U.S. Provisional Patent Application Ser. No. 61/494,952, filed Jun. 9, 2011 entitled "High Density Source Spacing Using Continuous Composite Relatively Adjusted Pulse", which are all incorporated herein in their entirety.

STATEMENT REGARDING FEDERALLY SPONSORED RESEARCH OR DEVELOPMENT

None.

FIELD OF THE INVENTION

This invention relates to emitting seismic energy into a marine environment that is able to travel into the seafloor and reflect from and refract through geological structures and be received and recorded by hydrophones.

BACKGROUND OF THE INVENTION

It is very expensive to acquire seismic data in marine environments. The cost of mobilizing vessels, equipment and people can run in the several hundreds of thousands to millions of dollars per day. Thus, once the survey is started, there is a lot of pressure to acquire data twenty-four hours a day, seven days a week. A problem arises when another survey crew is collecting data in the same general area at the same time. The two operations may contaminate one another and be forced to work out a time sharing arrangement where only one crew acquires data for a period of time and then waits while the other crew takes a turn. It is common to time share seismic data collection in the North Sea off of northwest Europe and in the Gulf of Mexico among other active parts of the world.

A second concern in the collection of seismic data in marine environments is potential harm, injury or irritation of whales and other marine life due to the intensity of the energy coming off the conventional seismic sources. Air guns are used in an array formed from multiple air guns synchronized in a way to generate a single sharp pulse with short duration powerful enough to get echo returns from deep below the seafloor. The power of these pulses in the water are probably at least annoying to sea animals that use echo location like whales, dolphins and others. Seismic surveying techniques may cause these animals to leave the area and some believe that it may be harmful to sea life.

A solution is needed for each of these issues. A solution for both would be particularly well received.

BRIEF SUMMARY OF THE DISCLOSURE

The invention more particularly relates to a process for acquiring seismic data to provide information about geologic structures in the earth where a plurality of seismic receivers are provided to receive seismic energy. At least one pulse-type seismic source is provided to emit pulses of seismic energy into the earth and fired in a planned timing sequence defining at least one composite pulse where the composite pulse is distinctive, detectable and separable by one or more processing techniques. The seismic energy received by the seismic receivers is recorded and processed to identify and separate the composite pulse from other seismic energy and create an image of the geologic structures in the earth.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
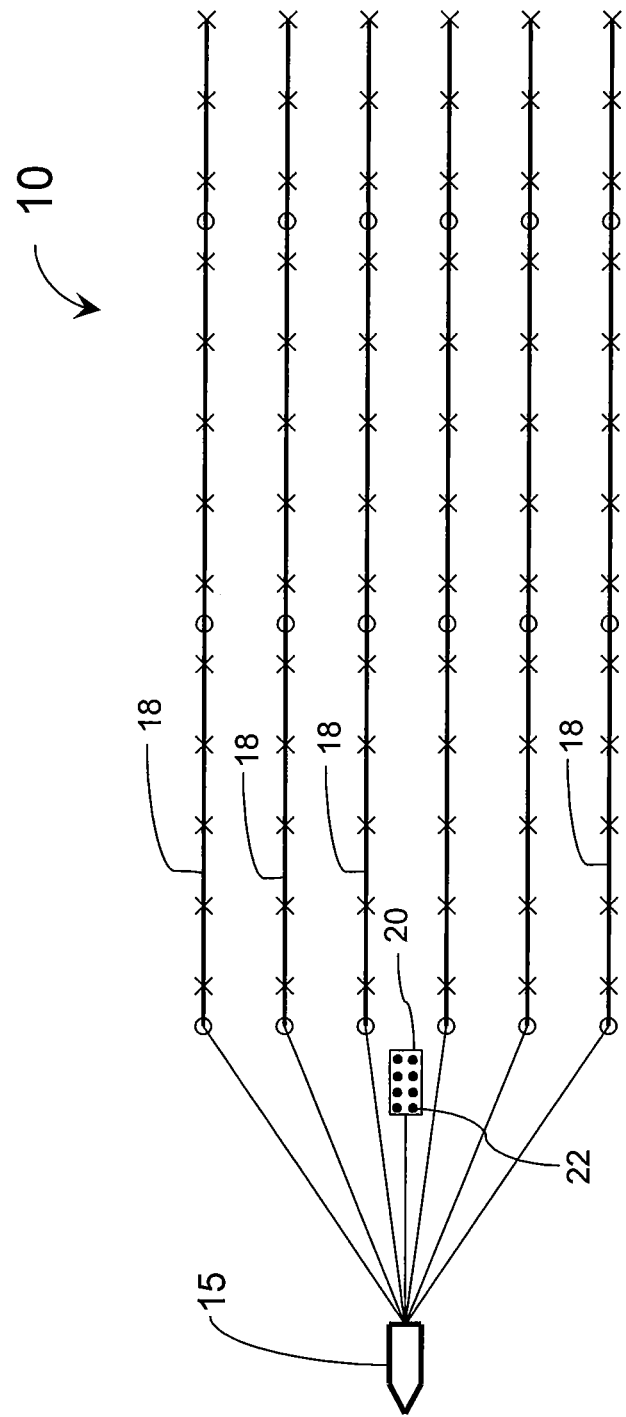
FIG. 1 is a schematic top view of a tow vessel towing seismic sources and streamers for acquiring seismic data in a marine environment.

For the purpose of this discussion an air gun seismic source will be used as an example of an impulsive seismic source. It should be understood that there are other impulsive sources that could be used with this invention for example plasma shots, steam injection sources or even explosive based sources. As shown in FIG. 1, a seismic acquisition system is generally indicated by the arrow 10. The system 10 includes a tow vessel 15 towing a number of streamers 18. Along each streamer 18 are a large number of seismic receivers, not specifically indicated. The tow vessel 15 also tows an example array 20 of seismic sources. It is common to use a number of air guns 22 in the array as the seismic sources where all the guns are fired in near unison or at once to create a powerful short period impulse of less than about twenty milliseconds (20 ms) to create a return wavefield that is perceptible by the seismic receivers along the streamers 18.

The current seismic acquisition state of the art require that all of the air guns in the arrays fire nearly at once with only minimal delays to tune the array to maximize the sharp peak at the beginning of the pulse. A common industry standard timing spec is that all guns must fire within 1 ms of each other.

If all the guns don't fire within the 1 ms window, then the array must be recovered and repaired until it meets the required specification. Normally a gun array will be formed of 2 to 3 sub-arrays, and each sub-array will be made up of around 8 to 10 individual guns or guns clusters of varying sizes. In normal operation, all 30 odd of these guns will be fired almost simultaneously to try and create a single, sharp peak of energy. The varied sizes of the guns provide a large composite peak of energy with little or no reverberation by firing near simultaneously and creating air bubbles that tend to cancel each other out so that the large composite peak will propagate through the sea and into the seafloor. By conventional standards this is the optimal way of sourcing marine seismic data.

Figure 2:
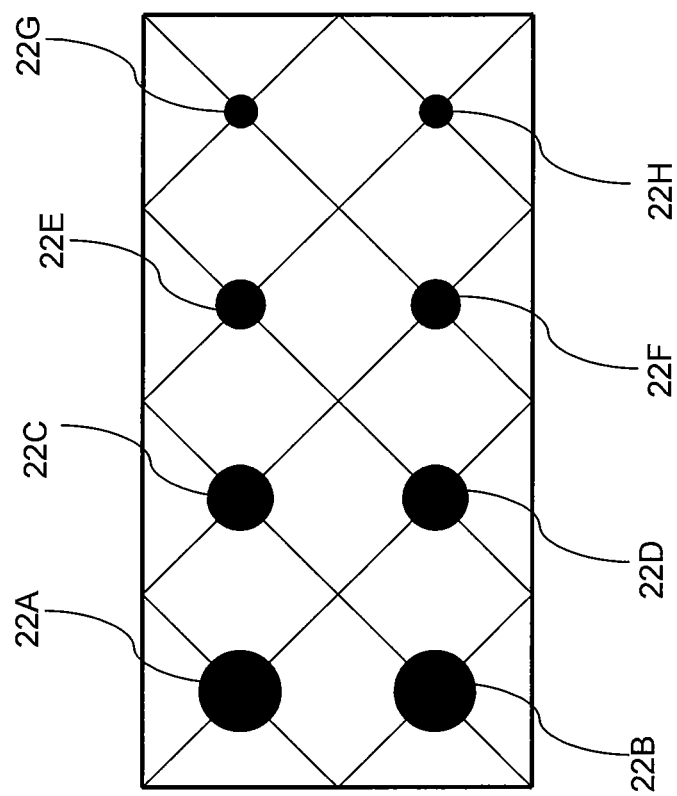
FIG. 2 is a schematic top view of an example source array of air guns.

According to the present invention, the guns within an array should not be fired in unison or near unison, but are fired in a coded and time delayed sequence that is unique or at least distinctive so that it can be distinguished in the return wavefield from other coded sequences. The sequence or series of pulses define a composite pulse which is like a short rumble instead of the traditional crack of the guns firing in unison and there is no large composite peak at the start of the source event. In a preferred arrangement as shown in FIG. 2, the array 20 comprises air guns 22A, 22B, 22C, 22D, 22E, 22F, 22G and 22H. Typically, an array of air guns may exceed eight and be as many as 11 per sub-array. This results in 24 guns to 33 guns per source. In the example array 20, air guns 22A and 22B are extra large volume air guns that tend to provide more low frequency seismic energy, air guns 22C and 22D are large volume air guns that generate a lower range frequency end, 22E and 22F are medium sized air guns that provide more mid-frequency seismic energy and 22G and 22H are small volume air guns that provide higher frequency seismic energy. In practice air guns are broad band but tend to have different amplitude energy levels at different frequency bands that in general can be related to the gun's volume size. Normally, the array comprises many different volume sizes of air guns and it is typical to have more small air guns than large air guns to make up for the lower amount of energy that is released by one pulse of each smaller air gun. This is all part of the traditional tuning of the source to give the sharpest, cleanest peak with the minimal bubble effects. The bubble effects are the trailing small energy pulses that occur after the first main sharp energy pulse and are the result of oscillation in the actual bubbles created by the rapid high pressure air release that occurs when a air gun fires. The bubble effects usually attenuate and have no significant energy after approximately 100 ms and are greatly attenuated within 200 ms.

Figure 3:
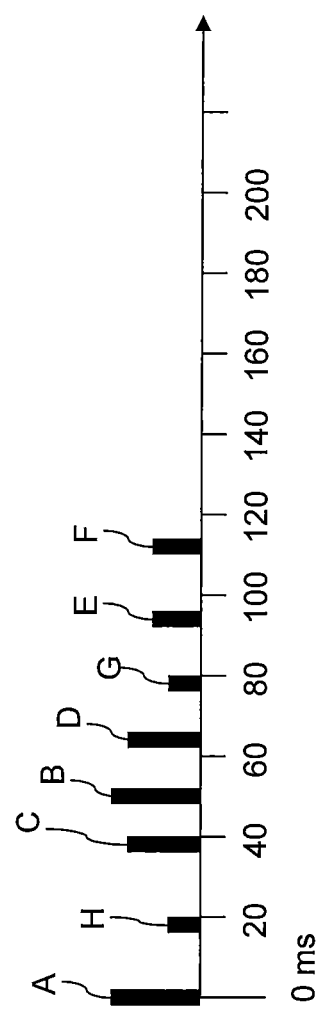
FIG. 3 is a chart showing an example series of pulses.

Continuing the explanation of the present invention as related to the first example air gun firing composite pulse, referring now to FIG. 3, is an air gun firing sequence for the air gun array designed so that the composite pulse will be unique as compared to the firing sequence of any other sources in the vicinity. These other sources could be towed by the same or other vessels which offer great flexibility in acquisition designs and field operations. An example composite pulse is shown in FIG. 3 where A indicates the firing of air gun 22A and B indicates the firing of air gun 22B and so on. The elapsed time between each air gun firing is typically measured in tens to hundreds of milliseconds, but as long as it is unique, computer analysis of the return wavefield will be able to identify pulses from the example array 20 as distinct from pulses from any other source. The order of firing of the individual guns can be used to help encode the source to make it a unique or distinctive composite pulse along with variations in the timing delays between guns. Additionally the same gun may be used multiple times with the gun cycle time being a restriction to the minimum time before a gun could be reused.

Figure 4:
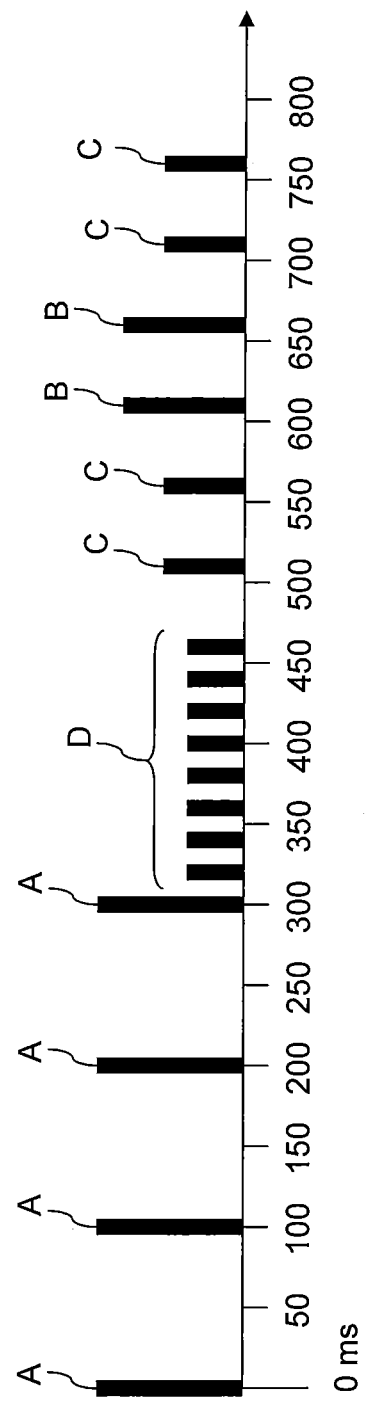
FIG. 4 is a chart showing a second example series of pulses.
Figure 5:
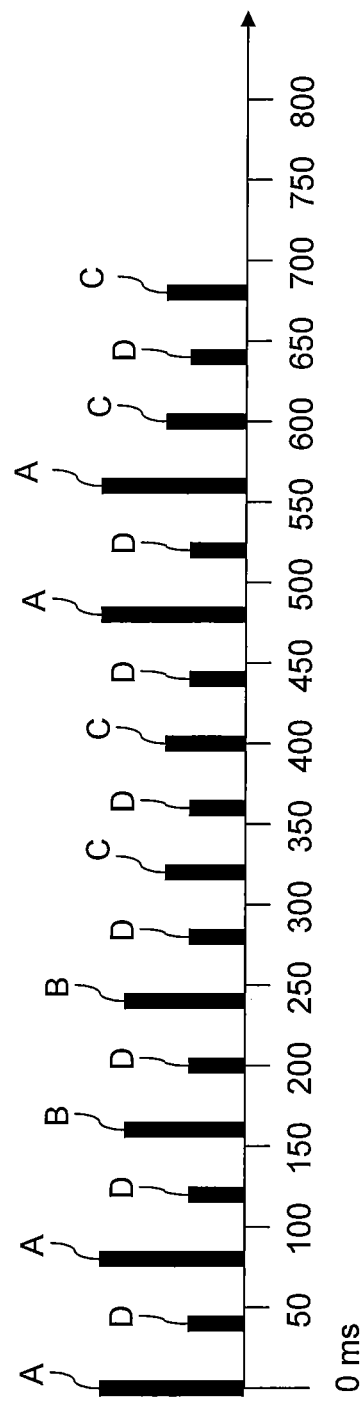
FIG. 5 is a chart showing a third example series of pulses.

As a second example air gun composite pulse is illustrated in FIG. 4, first four large air guns would fire, say 280 CI (cubic inch), in a sequence each indicated by the letter A, where the firing of each is spaced apart by 100 ms. Immediately thereafter, eight smaller 80 CI guns fire a staccato burst separated by 20 ms indicated by the letter D. The composite pulse would continue with four medium guns of 120 CI firing at 50 ms apart indicated by the letter C with two medium large 200 CI guns indicated by the letter B firing right in the middle of the medium guns. The signature of the composite pulse would be quite recognizable by standard shaped filtering, correlation or inversion techniques or other recognition techniques and the data could easily be extracted. At the same time, as a third example shown in FIG. 5, a different vessel in the area that has a similar array of sources but having a different sequence composite pulse such that the air gun firing is coded so that all the guns would be fired in 40 ms intervals in a composite pulse sequence started with a single 280 CI gun, indicated by the letter A, followed by a single 80 CI gun, indicated by the letter D, followed by a second 280 CI gun (A), followed by a second 80 CI gun (D), followed by a 200 CI gun (B), followed by a third 80 CI gun (D), followed by a second 200 CI gun (B), followed by a fourth 80 CI gun (D), followed by a medium 120 CI gun (C), followed by a fifth 80 CI gun (D), followed by a second medium 120 CI gun (C), followed by a sixth fifth 80 CI gun (D), followed by a third large 280 CI gun (A), followed by a seventh 80 CI gun (D), followed by a fourth large 280 CI gun (A), followed by a third medium 120 CI gun (C), followed by an eighth 80 CI gun (D), which is finally followed by a fourth medium 120 CI gun (C) where the entire array has been completely fired. This rumble would be distinctly different from the second example composite pulse in that all of the big guns are separated by smaller guns in the third example where in the second example composite pulse, there are portions of the sequence where the big guns are fired one after the other. With these two very different composite pulses, both arrays could be fired starting at approximately the same time, recorded at the same time and be distinguished from one another. One should recognize that air guns for marine seismic acquisition come in many, many sizes and are made by different manufacturers which may provide sufficient distinction in the shot record. Conventionally, there are at least twenty different sizes and models available. While it is conventional to have an assortment of different sizes, not all arrays have to have the same number of air guns, the same sizes of air guns, multiple air guns within an array may be fired simultaneously, the time difference between shots is clearly variable, and there are many, many possibilities for unique coding. Given the possibilities for unique coding, there is little to stop seismic acquisition teams from firing many, many arrays in the same close area, where they could all be uniquely encoded and separable in processing.

This can be analogized to being in a crowded room with a lot of people talking and a person being able to lock his hearing into one person talking just based on some uniqueness of that person's voice. Not necessarily because that person is talking louder than others, but because of some combination of tone or frequency or amplitude variations of the speakers voice. There are some very key analogs that can be derived from this concept of a crowded room and trying to listen to a conversation. One is that the source must put out a sufficient volume to be detected. But at the same time just going louder tends to encourage other sources to also get louder which provides no advantage. Another observation is that the more unique a person's voice is, the easier it is to sort out or distinctly hear that person's voice from the others in the room. Thus, the number of alternative noise sources that are active in the room, the more unique the person's voice should be to hear it. Returning to the sequence of firing a source array, the variations in size, timing and duration of the firing of the coded shot should be carefully designed prior to acquisition. To a certain extent, the various unique composite pulses that may be used might also be site specific and variable from site to site. There may not be one "perfect" answer but this can easily be modeled and tuned for different situations.

The first benefit of delivering seismic energy into the marine environment in this manner is that it would allow two or three or even many different survey teams to operate at essentially the same time in the same area. This is a breakthrough for field operations and acquisition as it completely eliminates the traditional time share problem of the conventional sharp peak air gun sourcing. This also allows for wide azimuth acquisition in a cost effective manner as we can now source many different lines at the same time and at much tighter station spacing with minimal to no contamination. This can be done because the unique signature of the pulses can be identified by each system and will ignore the other pulses as noise. This can be done through the inversion process of the data. Essentially, the processing would involve taking a block of simultaneously recorded data starting at the time zero for a particular unique source signature and then shape filter, correlate or even invert for the actual shot record and the desired output listen time. These processes like inversion are standard for the ZenSeis™ acquisition technique and there are many related patents on the art of this technique.

The second benefit of delivering seismic energy into the marine environment in this manner is that it distributes the energy into the water over time in such a manner that the peak energy is significantly less. Actually, based on current methods of calculating energy emitted into a marine is based on measurement of peak signal as compared to bubble size created by each pulse. Bubbles created by air guns are very elastic in water and appear to bounce in size from a large bubble to a small bubble and back to a large bubble. As the bubble created by one air gun is created, another air gun is fired such that the ratio actually may be negative. A negative ratio would imply that sound is actually being taken out of the water, but that is an artifact of the calculation. What is important is that with the present invention, what would have been a very loud crack or bang becomes a more tolerable background rumble that should be much less irritating to marine life. A very good analogy to this is listening to the thunder. When one is close, it can be quite scary and quite a shock as it is quite loud and forms a strong pulse. On the other hand, due to interactions of the thunder crack with the earth effects, at long distances thunder is just a low rumble which is much more tolerable. The invention takes the sharp crack of thunder and turns it into a rumble that is uniquely tuned to each source and the rumble is never the loud crack even if you are close to the source. Thus, seismic surveying in a marine environment becomes multiple rumbles occurring at once and each can easily be sorted out to know where it came from.

Figure 6:
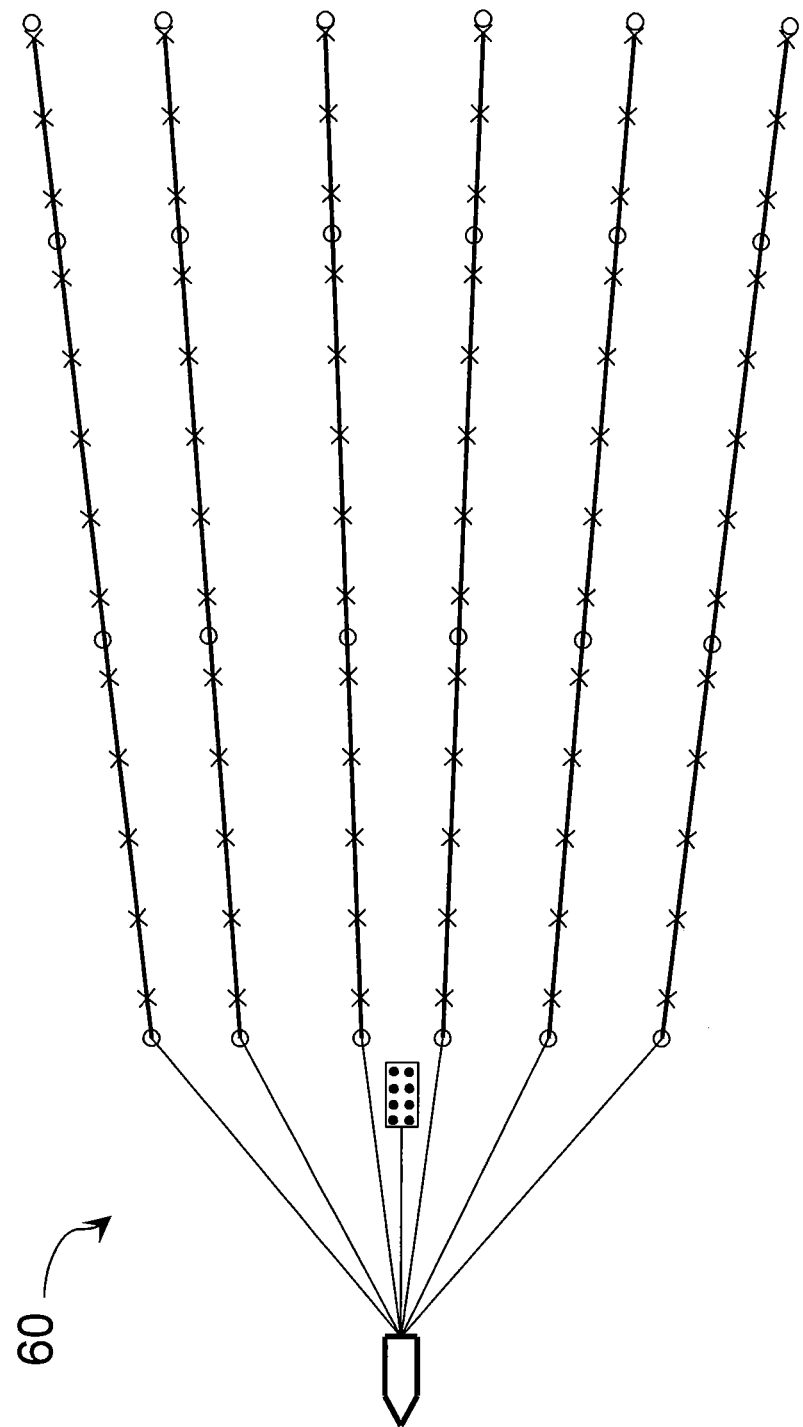
FIG. 6 is a schematic top view of a tow vessel towing seismic sources and streamers where the streamers are flared.
Figure 7:
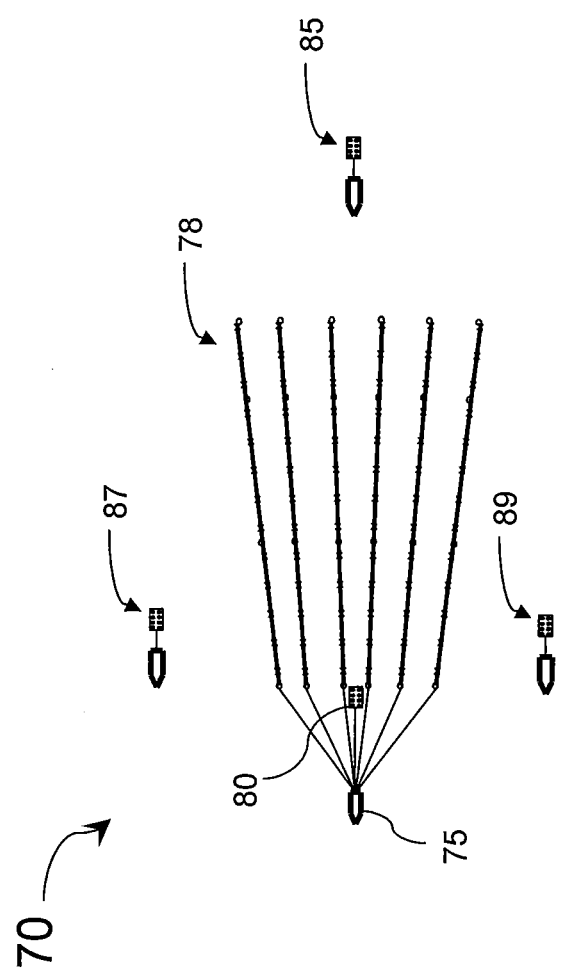
FIG. 7 is a schematic top view of a tow vessel towing seismic sources and streamers with additional source vessels towing additional seismic sources operating in conjunction with the tow vessel to acquire a higher volume of seismic data in one pass through the survey area.

Turning now to FIG. 6, a marine seismic acquisition system 60 with a flared streamer array is shown that is comparable to the system 10 in FIG. 1. The flared streamer array 60 is preferred in that the risk of gaps of coverage in both the near receivers (closest to the tow vessel) and far receivers (farthest from the tow vessel) is reduced. Turning to FIG. 7, a marine seismic acquisition system is indicated by the arrow 70. In system 70, a streamer array 78 is towed by a tow vessel 75. Tow vessel 75 includes a source array 80 that comprises a plurality of pulse type seismic sources such as air guns that are arranged to be fired in the manner described above where the air guns in the air gun array are fired in a sequence that is uniquely coded and identifiable in the return wavefield where the energy is spread out over time. However, the system 70 includes auxiliary source vessels 84, 86 and 88 and their source arrays 85, 87 and 89, respectively, arranged to follow the tow vessel 75 on either side of the streamer array 78 and, optionally if chosen, behind the streamer array 78. Each auxiliary source vessel has its own unique air gun firing sequence whether the source array is identical to any other source array. As such, acquiring seismic data with the system 70 may include a unique rumble from the array 80 followed by a unique rumble from array 85, followed by array 87 and thereafter followed by array 89. The seismic receivers on the streamers 78 are continuously recording seismic data along with their location based on GPS data. While each source array is waiting for its turn to rumble, a suitable listening time elapses so that signals from one rumble do not provide errant information into a second rumble of the same source array. Actually, the rumbles from various source arrays do not need to wait on one another but are only ordered within system 70 so as to minimize the peak energy delivered into the sea irritating the marine life. As such, source arrays 80, 85, 87 and 89 could fire simultaneously or near simultaneously or overlapping or whatever. Such an arrangement where the source array is waiting for its turn to rumble may be understood when referring to FIG. 8 where the timing of each rumble is shown on the timeline along with listening time.

Figure 8:
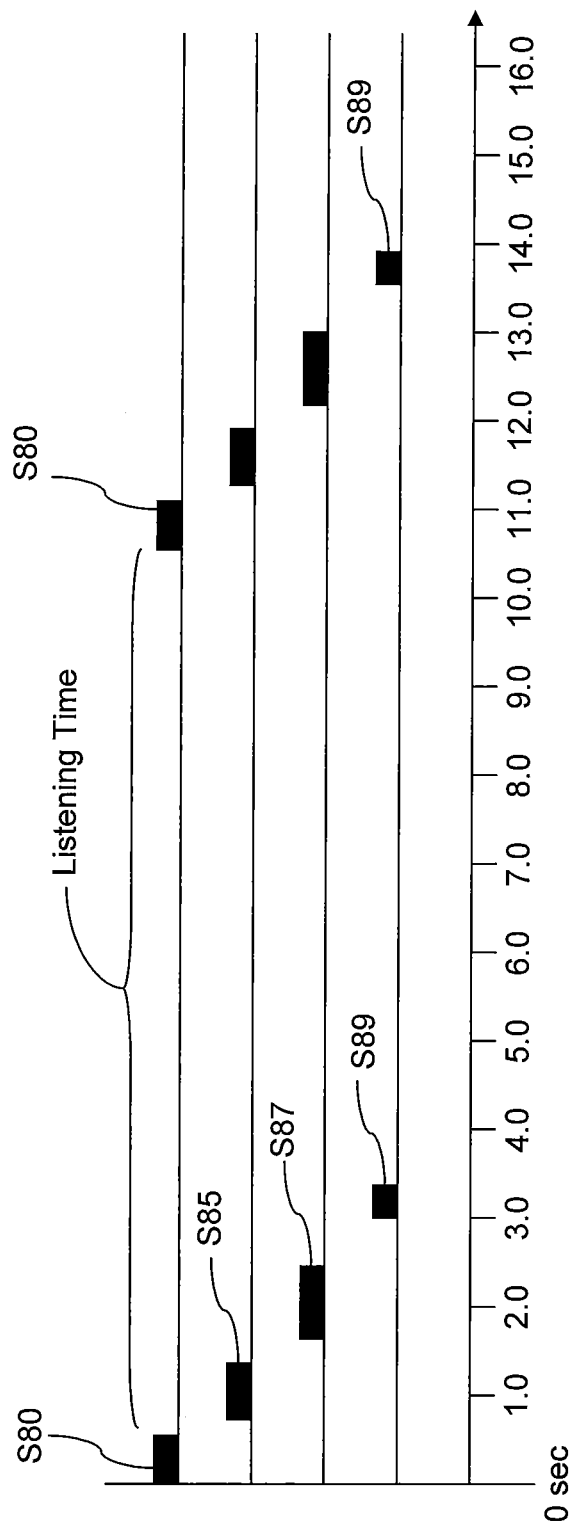
FIG. 8 is a chart showing a plan for several source arrays to deliver unique shot sequences and collect data in a single receiver array.

Referring specifically to FIG. 8, the four source arrays 80, 85, 87 and 89 are set to fire in a synchronized pattern where source array 80 begins its composite pulse at time zero as indicated at S80 and completes the composite pulse in less than a second. A ten second listening time is allowed for the return of the wave field from source array 80 before the same source array is fired again. Meanwhile, the composite pulse for source array 85 is initiated as indicated at S85 which is shown to be after the completion of the composite pulse for source array 80. It may be preferred that the composite pulses of two or more source arrays are not overlapping so as to minimize the energy introduced into the water in respect of marine life. However, as long as the composite pulses are unique, overlapping is not a problem for data collection. Continuing with the explanation, the composite pulse for source array 87 as shown at S87 is initiated and thereafter the composite pulse for source array 89 as shown at S89 is initiated. Two additional observations should be made at this point. First, the composite pulses are not necessarily of the same length as shown by different length bars in FIG. 8. Secondly, with long listening time, and no limit on firing other unique source arrays, there is a lot of time available to perform seismic surveying while avoiding the energy peaks of current technology. While the sources may be fired in a serial manner as described above or fired asynchronously (without respect of another firing) or even synchronously (where the firing of sources is synchronized with other sources). There are no real limitations of how the various sources are fired other then operational issues such as where it is desired to maintain a relative spacing between the sources and the receivers. The only requirement is that the receivers are recording continually or sufficiently continually to capture the wavefield, because we know where the individual shots were started and what unique coding was applied with a specific source array.

Two separate crews using the inventive techniques may overlap signals, however, it would not be advised to try and collect data with a conventional sharp pulsed air gun system while an inventive system is in the area. The conventional system will not interfere very much with an inventive system, but the conventional system will likely have difficulty identifying their generic return wavefield from the returning wavefields from the inventive system.

Figure 9:
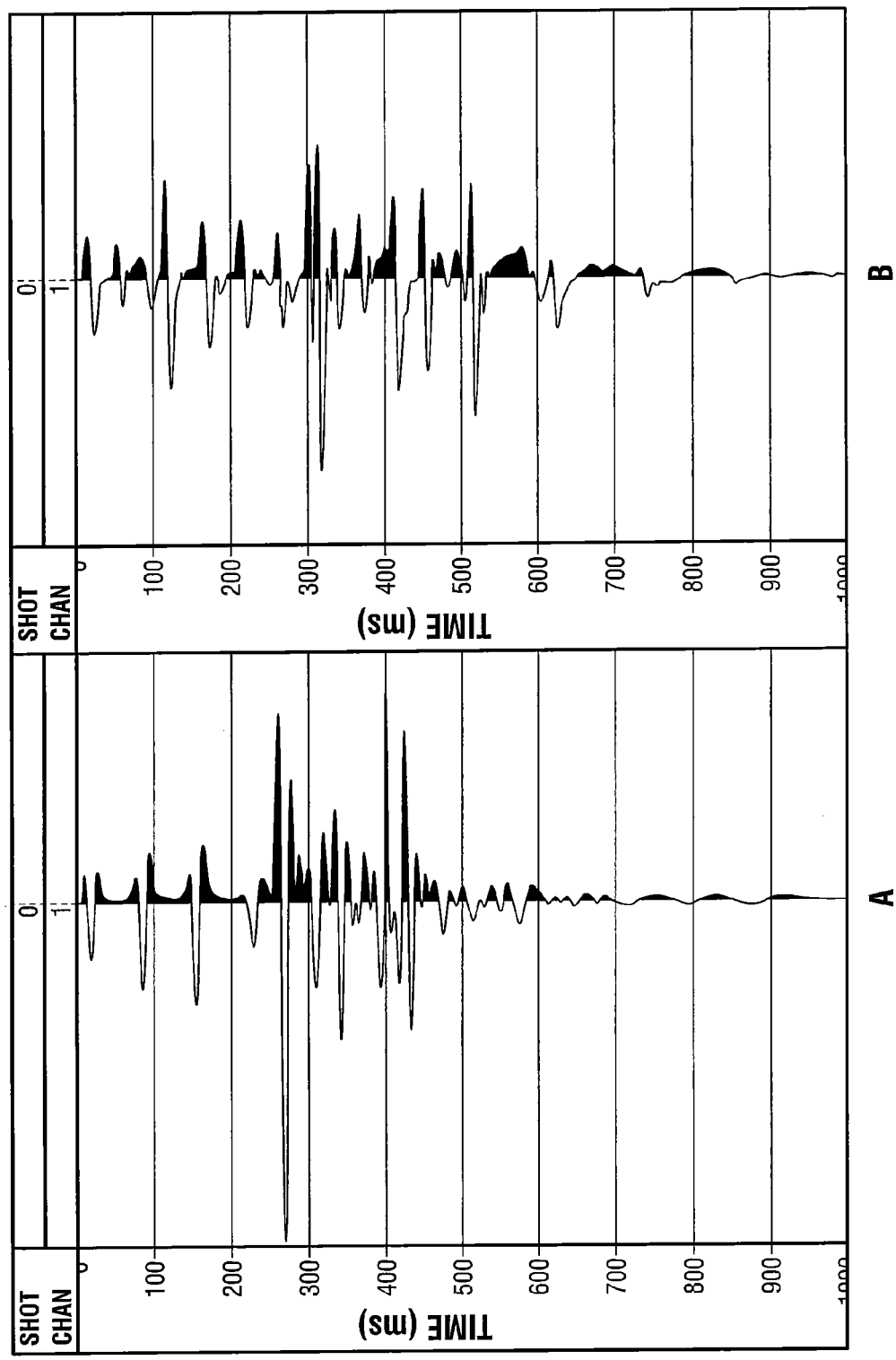
FIG. 9 is a chart showing a comparison of the time and intensity of the energy emitted with the firing of the same array of air guns where two different firing sequences are undertaken, Sequence A and Sequence B.

While the impulses of the various air guns have been shown in a simplistic form in the previous drawings, FIG. 9 shows two example composite pulses that have distinctive signatures created by multiple delayed firings of one or more air guns or other impulse type sources. While the two composite pulses may appear as squiggly lines to an ordinary observer, the location and intensity of the peaks and their decay pattern will be more distinctive than two very dissimilar fingerprints to an FBI lab technician. When the two composite pulses are used simultaneously or near simultaneously, the distinctive differences will result in a combined source wavelet that will propagate through the earth and back to the seismic receivers where seismic wavefield is recorded. By the use of match filtering techniques, inversion techniques or other processing techniques the recorded wavefield can be separated back into two wavefields, each from one of the two original composite pulses.

It should further be understood that prior to undertaking the data collection, the composite pulses that will be used should be designed and analyzed for their distinctness. There are many methods of creating distinctiveness and it is believed that distinctiveness can be designed such that every composite pulse can be provided with no more than two consecutive pulses that will be exactly the same and that any three pulses in a row can be made distinctive in a large number of sequences based on time delays between pulses and the uniqueness of various individual sources or guns.

Moreover, this type of seismic data acquisition should not be limited to a marine environment. While pulse type sources are commonly used in marine environments, pulse type sources maybe used on land, too. As such, a land application using pulse type sources with distinctive sequences for source separation should be equally useful and beneficial on land. Thus, the same techniques for simultaneous sourcing, compositing pulses and unique or distinctive encoding described above can easily be performed on land also. Conceptually, it is easier to explain the intricacies of the technique in a near homogenous medium like seawater with air guns and the bubble effect then to explain the same results with an impactive source and the natural plate bounce that occurs when say a hammer hits a baseplate in contact with the earths surface on land and where there is an elastic transfer of energy to the ground. The same approach to coding the composite pulses and maintaining distinctive composite pulses can be applied to land impactive sources for example accelerated weight drops, thumpers, explosives or even a conventional land vibrator with certain modifications to the hardware.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for acquiring seismic data and providing information about geologic structures in the earth, wherein the process comprises:
    a) providing a plurality of seismic receivers to receive seismic energy;
    b) providing at least three pulse-type seismic sources to emit pulses of seismic energy into the earth, wherein no more than half of the plurality of seismic sources are fired in unison;
    c) firing a plurality of pulse-type seismic sources in a planned timing sequence of pulses to define a composite pulse where the composite pulse is distinctive, detectable and separable from other seismic energy by one or more processing techniques;
    d) receiving seismic energy at the seismic receivers;
    e) recording seismic energy received by the seismic receivers; and
    f) processing the recorded seismic energy to separate the seismic energy to identify and separate the composite pulse from other seismic energy and create an image of the geologic structures in the earth below the seafloor.

2. The process according to claim 1, wherein the composite pulse is made up by varying the order of firing of the pulse-type seismic sources.

3. The process according to claim 1, wherein the composite pulse is made up by varying the timing between the firing of each of the pulse-type seismic sources.

4. The process according to claim 1, wherein the composite pulse is made up by varying both the order and timing of the firing of each of the pulse-type seismic sources.

5. The process according to claim 1 where a first seismic source is towed by a vessel, and a second seismic source is towed by the same vessel and the repeated composite pulse firing sequence of the first source is distinct from the repeated composite pulse firing sequence of the second source so that two distinct pulse-type wavefields are produced.

6. The process according to claim 5 where a third seismic source is towed by the vessel, and the repeated composite pulse firing sequence of the third source is distinct from the composite pulse firing sequences of the first and second sources.

7. The process according to claim 1 where a first seismic source is towed by a first vessel, and a second seismic source is towed by a second vessel and the repeated composite pulse firing sequence of the first source is distinct from the firing composite pulse sequence of the second source.

8. The process according to claim 1 further comprising a plurality of vessels where each vessel is towing at least one seismic source in the water and wherein each seismic source has its own distinctive composite pulse firing sequence and the sources are fired in a synchronized order.

9. The process according to claim 1 further comprising a plurality of vessels where each vessel is towing at least one seismic source in the water and wherein each seismic source has its own distinctive composite pulse firing sequence and the sources on the separate vessels are fired in a non-synchronized order.

10. The process according to claim 1 where the plurality of seismic sources are towed by a vessel and comprise a first array, and a second array of seismic sources are towed by the same vessel and the composite pulse firing sequence of the first array is distinct from the composite pulse firing sequence of the second array.

11. The process according to claim 1 where the plurality of seismic sources are towed by a vessel and comprise a first array, and more then two additional arrays of seismic sources are towed by the same vessel and the composite pulse firing sequence of the first array and all other arrays are distinct from the composite pulse firing sequence of all other arrays.

12. The process according to claim 1 where the plurality of seismic sources are towed by a vessel and comprise a first array, and a second array of seismic sources are towed by a second vessel and the composite pulse firing sequence of the first array is distinct from the firing sequence of the second array.

13. The process according to claim 1 further comprising a plurality of vessels where each vessel is towing at least one array of seismic sources in the water and wherein each array has its own distinctive composite pulse firing pattern and the arrays are fired in a synchronized order.

14. The process according to claim 1 further comprising a plurality of vessels where each vessel is towing at least one array of seismic sources in the water and wherein each array has its own distinctive composite pulse firing pattern and the arrays are fired in a non-synchronized order.

15. The process according to claim 1 wherein the seismic source is in the water and the firing of the plurality of seismic sources creates a rumble in the water.

16. The process according to claim 1 where a first seismic source is moved onto a desired location, and a second seismic source is moved onto a desired location and the repeated composite pulse firing sequence of the first source is distinct from the repeated composite pulse firing sequence of the second source so that two distinct pulse-type wavefields are produced.

17. The process according to claim 16 where a third seismic source is moved onto a desired location and the repeated composite pulse firing sequence of the third source is distinct from the composite pulse firing sequence of the first and second sources.

18. The process according to claim 1 further comprising a plurality of seismic sources that are moved onto desired locations and wherein each seismic source has its own distinctive composite pulse firing sequence and the sources are fired in a synchronized order.

19. The process according to claim 1 further comprising a plurality of seismic sources that are moved onto desired locations and wherein each seismic source has its own distinctive composite pulse firing sequence and the sources are fired in a non-synchronized order.

20. The process according to claim 1 where the plurality of seismic sources are moved onto a desired location and comprise a first array, and a second array of seismic sources are moved onto a desired location and the composite pulse firing sequence of the first array is distinct from the composite pulse firing sequence of the second array.

21. The process according to claim 1 where the plurality of seismic sources are moved onto a desired location and comprise a first array, and more then two additional arrays of seismic sources are moved onto other desired locations and the composite pulse firing sequence of the first array and all other arrays are distinct from the composite pulse firing sequence of all other arrays.

22. The process according to claim 1 where the plurality of seismic sources are moved onto a desired location and comprise a first array, and more then two additional arrays of seismic sources are moved onto other desired locations and wherein each array has its own distinctive composite pulse firing pattern and the arrays are all fired in a synchronized order.

23. The process according to claim 1 where the plurality of seismic sources are moved onto a desired location and comprise a first array, and more then two additional arrays of seismic sources are moved onto other desired locations and wherein each array has its own distinctive composite pulse firing pattern and the arrays are fired in a non-synchronized order.

24. The process according to claim 1 wherein the seismic source is imparting seismic energy into the earth and the firing of the plurality of seismic sources creates a rumble in the earth.

25. The process according to claim 1 wherein the composite source comprises at least three seismic source firings within one, two, or four seconds of one another.

26. A process for acquiring seismic data and providing information about geologic structures in the earth, wherein the process comprises:
a) providing a plurality of seismic receivers to receive seismic energy;
b) providing at least one pulse-type seismic source to emit pulses of seismic energy into the earth;
c) firing the at least one pulse-type seismic source in a planned timing sequence of pulses to define a composite pulse comprising at least three seismic source firings within one, two, or four seconds of one another and wherein the composite pulse is distinctive, detectable and separable from other seismic energy by one or more processing techniques;
d) receiving seismic energy at the seismic receivers;
e) recording seismic energy received by the seismic receivers; and
f) processing the recorded seismic energy to separate the seismic energy to identify and separate the composite pulse from other seismic energy and create an image of the geologic structures in the earth below the seafloor.

* * * * *